Sept. 1, 1936.      L. H. BROWNE      2,052,552
MOTOR CAR CONTROLLING MEANS
Filed March 28, 1934      3 Sheets-Sheet 1
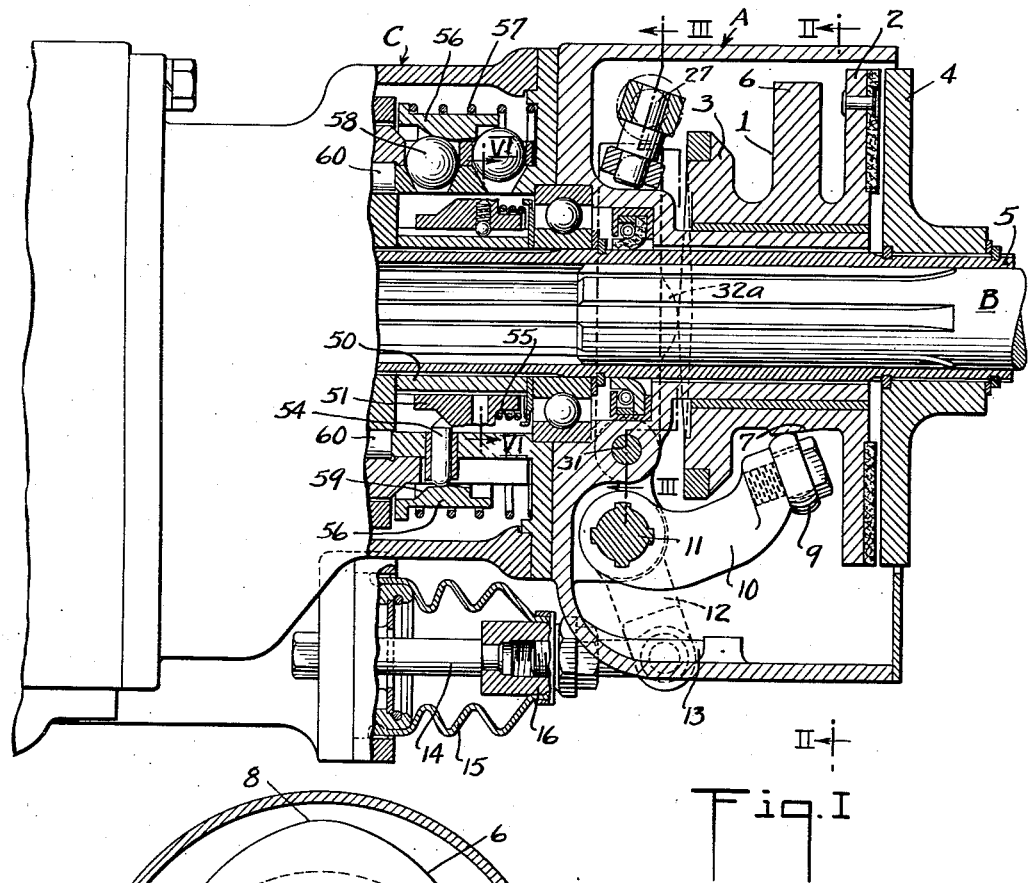
Fig. I
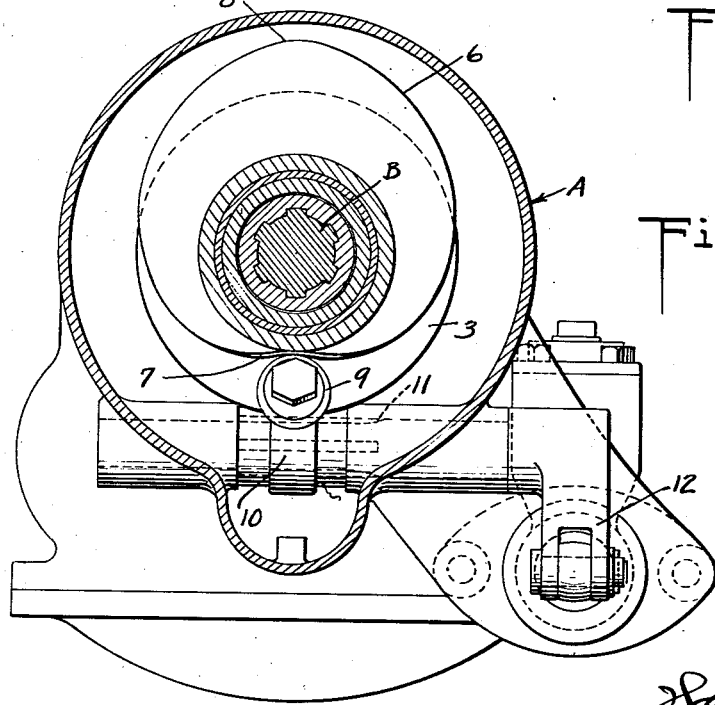
Fig. II.
INVENTOR
LINDSAY H. BROWNE
BY
ATTORNEY

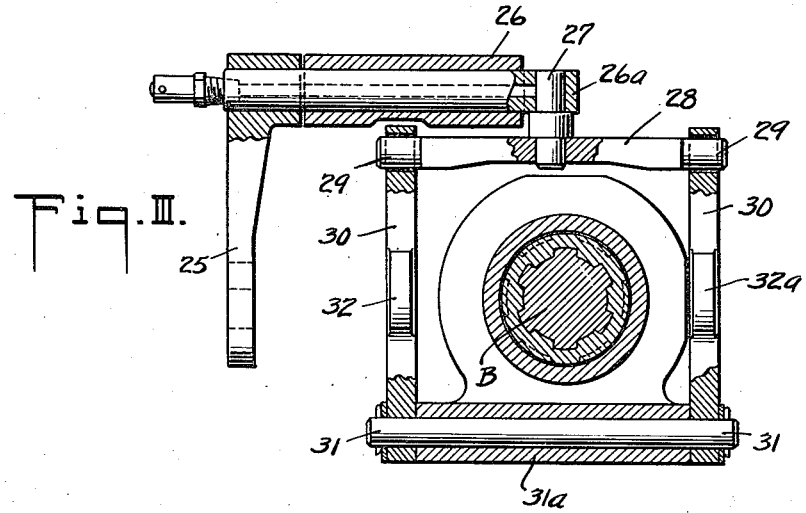
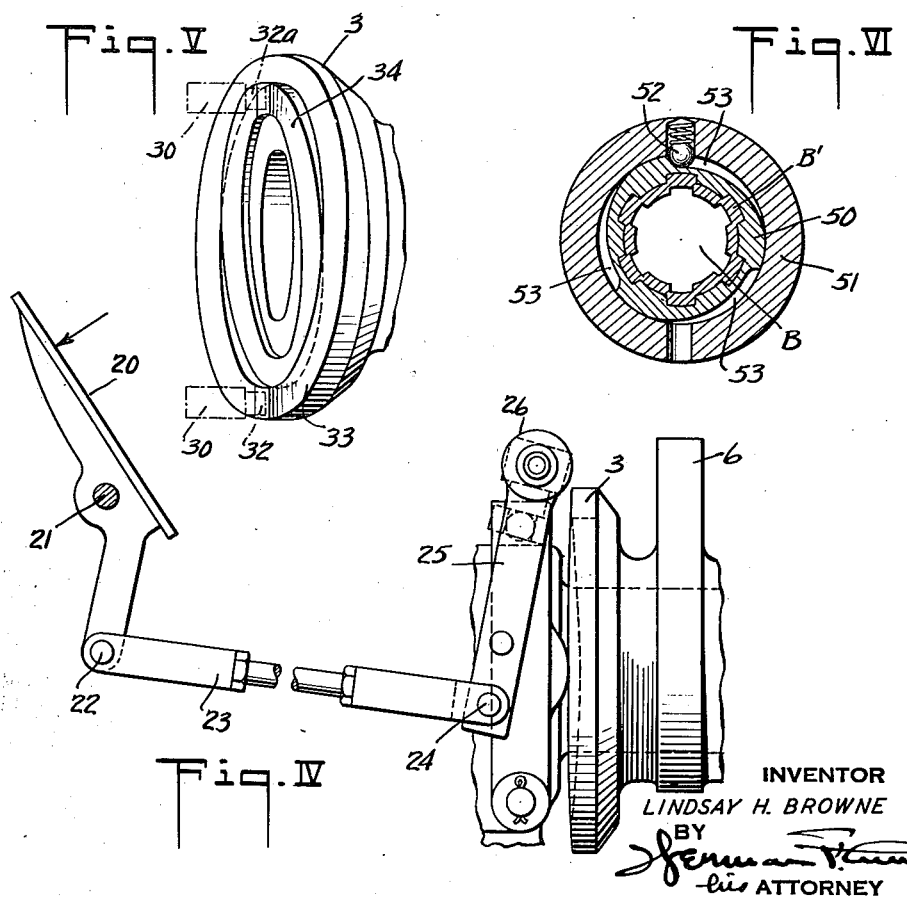

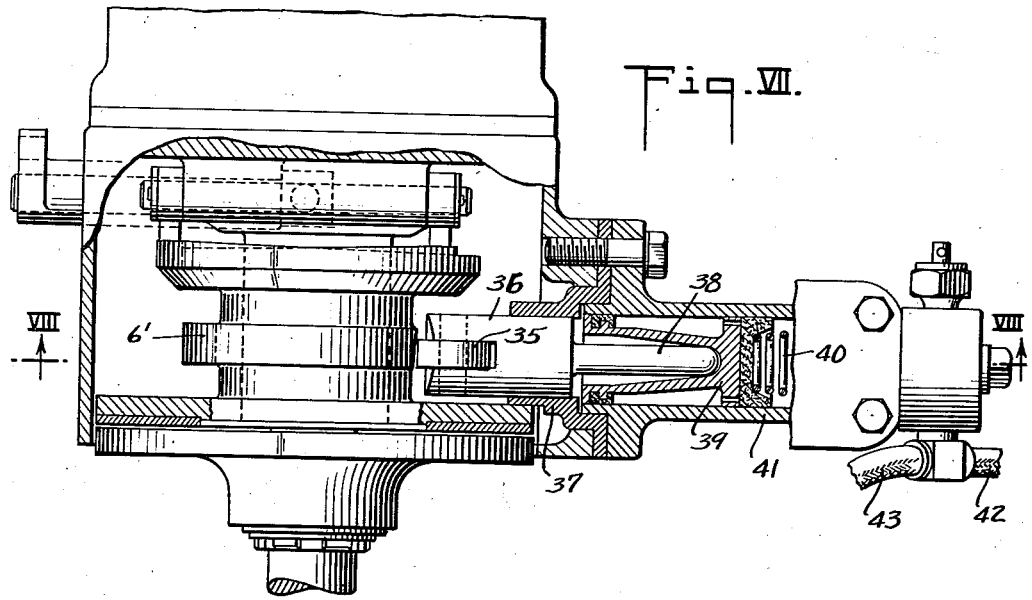
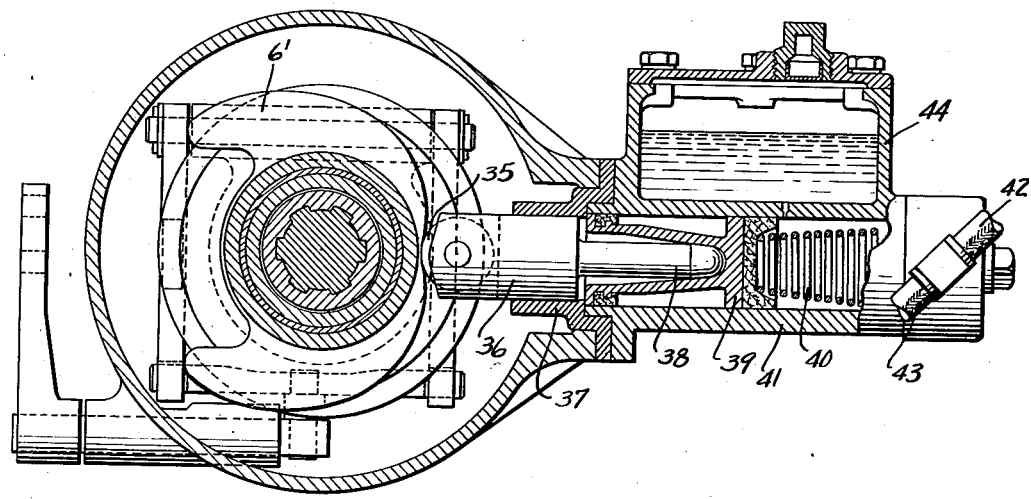

Patented Sept. 1, 1936

2,052,552

UNITED STATES PATENT OFFICE

2,052,552

MOTOR CAR CONTROLLING MEANS

Lindsay H. Browne, Rochester, N. Y., assignor to Josiah Anstice & Co. Inc., Rochester, N. Y., a corporation of New York Application March 28, 1934, Serial No. 717,757

9 Claims. (Cl. 188—140)

These inventions relate to the control of the operation of automobiles or like vehicles, and in particular the subject-matter hereof deals with the braking control.

The braking control involves the retardation or bringing to a stop the mass of the car when in forward or rearward movement, or holding the car stationary. Usual equipment provides for the actual retardation, and this application relates to the manipulation or the controlling of the application of the braking effort, as well as other features as will hereinafter appear from the detailed description of a particular embodiment illustrated in the accompanying drawings.

In particular the subject-matter hereof involves constructions for the purpose of applying what is known as a power brake to actuate the brake-rigging and wheel brakes, and means for setting in action, or relieving the power brake, and cushioning means to provide easy or gentle application of the power brake subject to the initial voluntary action of the operator, as well as various features of advantage for more perfect control of the automobile, which will appear from the more detailed description,—or be realized in the practice of this invention.

Also, in combination with power brake and its control, it involves certain features of construction in what I call a roll back stop, that is means for automatically, under proper conditions, effecting a braking or stopping of the car from rolling backward on an incline or under like conditions. In this respect such roll back stop forms a separate brake under the one condition, namely, for back rolling, and thereby anticipates the functions of the power brake under certain particular conditions of operation.

In part my inventions herein supplement—or are improvements of—the invention set forth in my copending United States patent applications Serial Nos. 696,763 filed November 6, 1933, and 709,581 filed February 3, 1934.

With respect to the features of invention relating to the power brake unit, my previous application provided for the input side of the power brake with linkage voluntarily operated to set the power brake into functioning, and with its initial action an automatic slight release before further energizing of the power brake unit. The present invention provides for such voluntary control in simplified form, and a slight release after the initial application of the brake by structure inherent in the power brake unit instead of due to the linkage connecting the operator's treadle with the brake-rigging on the output side of the power brake. It also provides for varied output of braking power from the power unit by means that are more accurately controlled, simple, durable and effective, under certain conditions of operation. As shown in the particular embodiment, I provide a heart-shaped cam actuated by the power brake clutch with a robust coordination of output braking power for transmission to standard forms of brake-rigging. In addition, I provide such transmission of braking power for its control through hydraulic brake operating connections.

As to the initial and further activating or energizing of the power brake unit, I provide a cam arrangement which initially starts to set the power brake clutch, and then automatically relieves the pressure, to avoid fierce or sudden application of the power brake, by arrangement of cams and the input pressure means moved by the voluntary action of the operator, so that the ease of application of the power brake is automatically assured by the structure in the power brake assembly, and is accomplished by precision due to the predetermined form of the cooperating parts of the power unit on the input side. In the form herein shown, this involves the transmission from the treadle of pressure on cheeks engaging cams on the flange of the power brake unit, so that the clutch engagement starting to turn the unit automatically turns the cams engaging the input pressure means when braking forward or rearward, so that an initial depression of the operator's treadle results, by the cams, in slightly negativing the effect of the operator until a further depression of the treadle, thereby assuring what I call the "feel" of brake application accomplishing the desired result of easy application for slowing down the motion of the car gradually, while at the same time the entire structure provides for any desired emergency sudden application of the braking.

As the conditions when on an incline make the braking to prevent back rolling desirable in a quicker and positive manner, the roll back stop functions to prevent the car from starting to roll back, but if backward movement or backing up is intentional, the roll back stop is set out-of-functioning, and then the power brake unit assumes the functioning for gradual retarding or controlling the rate of rearward movement. Under such conditions, it becomes essential for practical operation that so soon as the car has again started to roll forward, automatic means provide for resetting the roll back stop into its functioning position, and for that purpose I provide structure which positively holds the roll back stop out-of-functioning position when intentionally driving or rolling rearward, but which positively assures the resetting of the roll back stop when the car has started to move forward a predetermined distance. Such mechanism involves improvements over the construction shown in my copending application for United States Letters Patent Serial No. 649,890 filed January 3, 1933, and aims to provide more durable and positive actuating means to accomplish the desired results.

Particular forms of embodiment of my inventions are shown in the accompanying drawings, in which:

Fig. I shows in side view a power shaft with a power brake unit, and in section through the axis of the shaft a power brake unit combined with the roll back stop and its automatic setting mechanism.

Fig. II shows a cross-section in the plane II—II of Fig. I.

Fig. III shows in cross-section III—III of Fig. I, an elevation of the power unit input lever system.

Fig. IV is a side elevation of the power brake operating treadle and connections with the input parts and their engagement with the cam faces on the power brake flange.

Fig. V shows in perspective the face of the power brake flange with two cam tracks or faces.

Fig. VI is a cross-section on line VI—VI of Fig. I of the forward running release members to automatically set the back roll stop into functioning.

Fig. VII is a plan view, housing broken away, and some parts in section, of the power brake unit and its connections actuating the master cylinder of an hydraulic brake-actuating system.

Fig. VIII is a section on the line VIII—VIII of Fig. VII.

As shown in Fig. I, the casing A encloses a power brake unit encircling a power shaft B, and the casing C encloses a back roll stop-braking structure, and is attached to or supports the casing A and is connected with another casing which may carry the other parts of the power transmission cooperating with the power shaft.

The power brake unit 1, in the form here shown, is a single piece casting having a flange 2 to support a friction clutch member to derive momentum reaction on the power unit, and at the opposite end of the hub is a flange 3 with an end face carrying cams adapted to be pressed by lever or cam members in order to shift the power unit 1 into frictional engagement at its other end with a disc 4 having a hub attached to revolve with the power shaft B or with its cooperating sleeve 5. The power unit has, intermediate the input flange 3 and the friction or momentum-receiving flange 2, a cam 6.

As shown in Fig. II, this cam 6 is heart-shaped, and has a low point or dwell 7 beveled as shown, at the neutral position when the brakes are released and no force supplied by the power brake unit. The heart-shaped cam 6 has its contour symmetrically rising from the low or neutral point toward each side, to a common high point or toe 8 one hundred and eighty degrees from the neutral point. Engaging this cam 6 is a roller 9 mounted on the end of a brake-actuating arm 10 carried on a rocker-shaft 11 supported in bearings in the casing A, and at one end has the rocker-arm 12 connected with a rod 13 actuating another rod 14, which is operatively connected in any desired manner for the control of the hydraulic brake connections, or which may be connected in any suitable manner with rod or cable connections for the brake-rigging for mechanical application of the wheel brakes. The rod 14 is enclosed in an oiltight flexible casing 15, the coupling 16 providing for the securing of the rod parts and flexible casing.

As shown in Figs. I—III and V, the voluntary actuation, providing force for the input side of the power brake, includes the foot-treadle 20 pivoted at 21 and connected by an arm with a pivot 22 at the end of the link 23, in this form shown as a rod actuating from its other end through a pivot 24 in an input lever 25, in order to suitably oscillate the shaft 26,—and permit from the operator the desired pressure against the input end of the power brake unit. The shaft 26 turns the inner shaft 26ª to which is attached the stud 27 engaging a bridle 28 which at its ends is mounted in bearings 29 to the ends of the input pressure members 30—30, each of which at its opposite end is supported in a suitable bearing, such as the rod 31 carried in a solid stationary portion 31ª on the inside of the casing A. On each of these input arms 30—30 there is suitably located a contact portion or a swell or rise 32—32ª so positioned and adapted in shape to engage the cam face on the input flange 3 of the power unit.

The input flange 3 of the power unit, as more fully shown in Fig. V, has two concentric cam faces, the outer annular cam face or cam race 33 has the high point of its contour at one side of the flange 3, and the inner cam face or race 34 has its high point at the diametrical opposite side of the flange 3, with respect to the annular cam face 33. Each of these cam faces 33 and 34 recede symmetrically on either side of their high point, that is their profile falls away from the direction of pressure against the cam face by the contact members 32 and 32ª.

In Figs. VII and VIII a construction of power brake unit is shown in slightly modified form. The power brake unit actuating structure from the input side and the clutch or momentum friction parts are similar to that shown in Fig. I, but the power brake delivery or "output side" comprises a generally heart-shaped cam 6' not completely encircling the shaft. This heart-shaped cam has its neutral or low-contour point under non-braking conditions, located in a horizontal position and engaging a roller 35 mounted in the end of a plunger or bar 36 sliding in a bearing 37, with a stem 38 engaging a socket in a piston 39, which in turn is forced in one direction by spring 40 in order to press the roller 35 against the output cam 6'. The piston 39 reciprocates in the casing 41 forming a cylinder for oil serving to carry the pressure through the hydraulic brake operating pipes or tubes extending from the two stub ends of tubes 42—43, and in the usual manner to the wheel brake operating members. Above the cylinder 41 is an oil-tank 44 with a vent or small feed orifice 45, so that the casing 44 forms a supply tank providing for the flow of oil to the cylinder below when the hydraulic brakes are released, so that the spring 40 has forced the piston 39 clear of the oil-hole 45.

As shown in Fig. VI the power shaft sleeve B' suitably splined to the end of the power shaft B, has a sleeve 50 splined to it, and in turn is surrounded by a sleeve 51 movably bearing upon the outer surface of sleeve 50 and adapted to turn thereon freely in one direction, but automatically held by an over-running clutch such as a spring-pressed ball 52 engaging any one of the three cam faces 53—53—53 on the outer surface of sleeve 50. These cams 53 are positioned in a circumferential direction which permits the power shaft sleeve B' to turn in the direction of rearward motion of the motor car without turning the sleeve 51, but with the forward motion of the car the ball-clutch 52 effects a driving engagement, turning the sleeve 51 which may also slide, thereby automatically positions, after predetermined forward driving of the car, the back roll stop mechanism into functioning position. The turning of the sleeve 51 having spiral grooves on its outer surface functions as described in my co-pending application for United States Letters Patent Serial No. 649,890 filed January 3, 1933. The sleeve 51 has spiral grooves on its outer cylindrical face adapted to engage the inner ends of a plurality of pins 54 adapted to move radially, and which in their position shown in Fig. I lock the sleeve 51 against the action of the spring 55. The floating ring 56 adapted to operate for the setting of the back roll stop, holds the pins 54 in the position shown, but when the floating sleeve or ring 56 is pressed against the action of the spiral spring 57, in order to release radially a plurality of balls 58, it simultaneously releases the pressure against the outer ends of the pins 54, and sleeve 51 is pressed by the spring 55 so that the beveled end of sleeve 51 forces the tapered end of the pins 54 radially outward, causing them to over-ride the cylindrical surface of that sleeve and engage the spiral grooves in it, and the pins are there held so that their outer ends engage the tapered end 59 of the floating-ring 56 and prevent the floating-ring from shifting into the position that causes the setting of the back roll stop into functioning. The setting mechanism, as shown in Fig. I, is otherwise as described in my copending application, and provides for the back-roll-locking or releasing of the locking rollers 60 which effect the back roll stop, to prevent the car from starting to roll backward.

It will thus be seen that my power brake unit embodies not alone the power brake elements with the input and output mechanism, but also the self-contained controlling means for the input side to accomplish automatically the ease of actuation reflected in the "feel" of operating by the foot treadle.

The operation will be understood as an initial depression of the treadle 20 actuating through linkage the input pressure members 32—32ª, which respectively press against the cam faces 33 and 34 at their relative high point when the power brake unit is in neutral. This slight pressure on the cams moves the brake unit so that the flange with its friction surface engages the flange 4 fixed on and rotating with the power shaft, which in turn is revolving due to the momentum of the car, forward or backward. The first slight friction causes the power brake unit to start to turn, and the flange 3 with its two annular cam faces turns, at first slightly, so that the receding face of each cam moves away from the input pressure members 32—32ª, thereby relieving the pressure at the friction clutch. This prevents any fierce action or seizing of the clutch,—and the operator's foot on the pedal gives him the "feel" of an easy take-up of the brake, and the instinctive operating requirement that the treadle must be then depressed further in order that the effective pressure on the cams can be built up. With each slight additional movement of the treadle the cam faces further recede, thus automatically easing the pressure step-by-step, on the friction clutch. As the power brake unit for the purpose of output delivery for brake actuation, is limited to turning not more than one hundred and eighty degrees, the two concentric cam faces assure the desired functioning of gradual application within the entire range of the initial position or neutral, up to the maximum of brake application.

In like manner the reverse, namely, the release action of the brake is progressively eased, that is it avoids any sudden off and on actuation of the friction clutch.

The output side or brake application force delivery, in the form shown in Fig. I and sections thereof, involves the heart-shaped cam which is turned due to the force of frictional engagement with the moving part on the power shaft. As the power derived from the momentum of the car turns the unit, and thereby the heart-shaped cam, the contour of the cam is predetermined so that it moves the lever 10 rocking the shaft 11, and transmits the desired force to the lever 12 which is connected in any desired manner with the brake-rigging. While the lever is shown in one form connected with a plunger that may operate an hydraulic brake system, the lever, and in fact any suitable bell-crank or lever arrangement may be directly connected by link or cable to the brake-rigging in any of the standard forms of construction.

When using a cam and oscillating lever, as shown in Fig. I, the neutral point of the cam is preferably beveled as shown at 7, so that the pressure of the roller 9 tends to force the output cam in a direction that holds the clutch of the power brake unit out of contact. This bevel at the neutral point of the output cam may extend for ten or fifteen degrees on each side of the true neutral centre, so that as the power brake is released and the power unit is drawn to its neutral position by any suitable pull-back springs, as in the brake-rigging, the pressure of the roller 9 settling into the dwell 7 of the cam will positively force—and then hold the power brake unit clutch out of contact.

In the form shown in Figs. VII and VIII, the output cam of the brake unit is shifted ninety degrees so that the neutral point is in a horizontal plane, and therefore permits engagement direct with the end of a horizontal plunger actuating the piston of the hydraulic brake system. This accommodates in the simplest manner the supply tank or chamber which keeps the hydraulic brake operating system full by gravity feed to the horizontal cylinder directly below it. In the form shown, when the power brake unit is in neutral position the spring 40 forces the master cylinder piston into position uncovering a small oil feed hole in the bottom of the supply tank, and on the first slight movement of brake application that hole is covered by the piston skirt, effectively closing the hydraulic brake system for its proper function.

It will be seen that the power brake unit lends itself to simple and effective transmission of the amplified force for brake application, by movement of suitable members at right angles to the power shaft, or by introducing levers or a bell-crank, as shown in Fig. I, the brake-actuating member is moved in a direction parallel to the power shaft. The amplified power generated by the power brake unit may be applied to the brake-rigging or the hydraulic brake-actuating system, or any other brake-actuating means in any desired manner in addition to the two forms herein shown and specifically described. The force transmitted by the momentum of the car to the power brake unit may also be accomplished in a different manner than the form shown. The simple friction disc properly designed as to dimensions and material, substantially shown, is effective, durable and in every way advantageous, but for varied sizes or applications of my invention, other forms of friction clutch as multiple disc or cone clutch, or otherwise, may be used.

As the preferable arrangement of the input side of the power brake unit may require almost half a turn in order that the output cam properly delivers the desired force and suitable movement of the brake-actuating connection, it becomes necessary that the input pressure members engage the input cam usually more than a quarter turn. Also the unit must be operated in both directions, and the application of force I prefer to balance by applying the pressure on diametrically opposite sides and by an equalizing rigging, as shown. I accommodate these conditions by the two concentric annular cam faces, each of which may require for best operation, in both directions, the entire circumference. Consequently I machine the inner cam on the integral portion of the flange 3, and machine the outer cam face on a separate ring, and then secure it in any desired manner such as pressing or shrinking, welding or brazing to the flange 3 so that it becomes a permanent part rigidly functioning with the power brake unit.

It will be noted that the input cam and cooperating members and the output cam lend themselves to design as to contour or shape, as well as dimensions, to accommodate any desired input or output force and the desired amplitude of motion by the operator's treadle and the extent of motion desired for application of the brakes. For example, in one car I provide a treadle movement of about 1¼", and a ratio of levers provides an input pressure member movement of approximately $\frac{3}{16}$". The first slight engagement with the high point of the cam moves the main power unit into initial clutch-friction engagement, and the entire cam profile from high to low point is approximately ⅛", which provides the approximate 1¼" travel of the treadle,—to provide all the delicacy, ease and feel of operation. The power brake unit parts can therefore be predetermined to meet the requirements of any particular car, and when once made, installed and adjusted will function as desired irrespective of wear of parts. The entire mechanism lends itself to be suitably encased and to be mounted as a permanent part of the power transmission of a car with compactness, simplicity, low cost and durability.

It will thus be seen that the use of my invention involves a simple power brake which in neutral position entails no frictional wear. When braking is desired the operator's first slight depression of the treadle causes an initial slight frictional contact which partially turns the power brake unit, but the slight turning, due to the input cam contour, automatically releases the frictional contact assuring an easy application of the brakes. The operator then feels the results of his initial treadle depression, and then applies slight further pressure and may gradually increase the movement of the treadle, and in all assures the gentle application of the power unit, either for forward or rearward movement of the car by an appreciable amplitude of movement of the foot instead of only increasing the pressure.

As I prefer to combine with the power brake the back-rolling stop, the construction as shown is effective to prevent the car from starting to roll back, so that the back roll stop displaces any requirement of the power brake, when the roll back stop is set to function, namely, when the car is moving forward. However, when the roll back stop is set out-of-functioning position, then the power brake unit is available for its gradual retarding by voluntary action of the operator, while the construction, as shown, positively locks the back roll stop out-of-functioning.

While particular forms of construction are herein shown and specifically described, many variations may be made in the practice of my invention both as to form, arrangement as well as dimensions and otherwise.

What I claim and desire to secure by Letters Patent is:

1. Braking means for motor cars or the like, having a power brake frictionally actuated by the momentum of the car adapted to amplify the brake-actuating power applied to the wheel brakes, means to cause said power brake to function by relatively slight voluntary pressure, a power brake unit, a treadle and link connections to deliver pressure, a sliding or rolling member to apply said pressure to said power brake unit, a flange on said power brake unit having a cam to receive the input pressure, a second cam formed fixedly on said power brake unit for equal rotary displacement with the input cam, both cams being effective over a range in either direction approximating a half turn, said input cam having a receding annular face whereby upon partial turning of the power brake unit the initial input pressure is relieved until further motion of the voluntary actuating means.

2. Braking means for motor cars or the like, having a power brake frictionally actuated by the momentum of the car adapted to amplify the brake-actuating power applied to the wheel brakes, means to cause said power brake to function by relatively slight voluntary movement, said power brake embodying in a single unit in fixed relation, a friction face, a two-way cam for delivering the braking power and a two-way double faced annular cam to receive the input of voluntary power formed with a receding face, whereby the initial input of power results in a relief of pressure on the initial turning of the power unit.

3. A power brake unit for automobiles, comprising in a single unit such as a hub a frictional surface co-acting with a member of the car driven subject to the momentum of motion of the car, output means involving a symmetrical two-way cam and a cooperating plunger rod, and a flange to receive laterally voluntary input pressure having a symmetrical two-way cam with a face receding to both sides of a high dwell, means to deliver pressure against said flange cam so arranged and constructed whereby the turning of the power brake single unit in either direction relieves through the input pressure cam the initial pressure of energizing the power brake until further voluntary motion to deliver input pressure.

4. In a power brake of the class described, a shaft having one friction clutch member, a unit member mounted concentric with said shaft and adapted to have slight movement axially thereon, said unit member embodying in mutually fixed relation a friction clutch member, a two-way cam face for receiving pressure to effect axial movement of the unit and a cam to transmit movement by the rotation of said unit in either direction less than 180 degrees, characteristics of the axially moving cam and the cam transmitting motion by rotary movement being different, and so arranged and constructed that axial pressure on the unit causes the clutch engagement and a substantially uniform recession of the pressure receiving cam face and that said motion transmitting cam provides for variable movement upon its rotation.

5. A power brake for an automobile having a shaft with a servo element, a pedal and connections adapted to cause said servo element to function, a power brake unit comprising in a single member a two-way symmetrical cam mounted for axial movement under input pressure and upon partial rotary movement to relax the input pressure, and a two-way symmetrical eccentric cam on said unit for radial delivery of output power.

6. A power brake member comprising in a single unit a servo element, means to support the same for axial movement, an eccentric two-way output cam with each actuating face extending effectively through substantially more than a quarter of a rotation, double annularly lateral cam faces concentric with the unit each with contours diametrically symmetrical and effective throughout substantially more than a quarter of a revolution to receive and relax input pressure.

7. A power brake servo member having a unit adapted for functioning operation up to 360 degrees, means to support said unit permitting predetermined rotary reciprocations comprising a symmetrical two-way eccentric output cam for functioning 180 degrees in each direction of rotation, an axially displaceable flange to receive input pressure, cam faces symmetrically double acting throughout 180 degrees on said flange so arranged and constructed as to uniformly gradually release the servo member and a voluntary actuated means to apply pressure to said flange.

8. In an automobile, a brake-actuating means comprising brake-rigging, a power unit to deliver braking force positively in one direction only to said brake-rigging, a brake input pressure cam, said power brake embodying in a single member a servo element, a power output element and a servo input pressure control element, said power output element functioning in either direction of rotation substantially 180 degrees with variable action throughout its rotary displacement, and said servo input pressure control element so constructed and arranged as to cause slight axial displacement for servo engagement with uniform slight movement for each direction of rotation of substantially 180 degrees, with a different amplitude of motion during its rotation compared with the amplitude of motion delivered by the power output element.

9. In a motor car, a power brake, voluntary means to apply input pressure, a servo element to apply force from the driven shaft of the car, an intermediate single unit mounted for reciprocal rotation and slight axial movement and having rigidly combined in said unit a servo element, an eccentric cam for brake power output delivery, a flange adapted to receive input pressure, and a cam face on said flange adapted upon partial rotation of the unit to moderate the input pressure when the voluntary input actuating means are stationary.

LINDSAY H. BROWNE.